United States Patent [19]

Bender

[11] Patent Number: 5,269,723
[45] Date of Patent: Dec. 14, 1993

[54] VEHICLE AIR FRESHENER

[76] Inventor: Gene R. Bender, 2213 Orchard Rd., Camp Hill, Pa. 17011

[21] Appl. No.: 5,774

[22] Filed: Jan. 19, 1993

Related U.S. Application Data

[63] Continuation-in-part of Ser. No. 825,879, Jan. 27, 1992.

[51] Int. Cl.$^5$ .............................................. B60H 3/00
[52] U.S. Cl. ..................................... 454/157; 239/57; 422/124
[58] Field of Search ........................... 239/55, 56, 57; 422/123, 124; 454/156, 157, 291, 328

[56] References Cited

U.S. PATENT DOCUMENTS

| 170,990 | 12/1875 | Colburn | 454/328 |
|---|---|---|---|
| 1,100,751 | 6/1914 | Lindstrom | 422/124 |
| 1,246,529 | 11/1917 | Bieder | 422/124 |
| 1,250,891 | 12/1917 | Johnson | 454/291 |
| 2,435,096 | 1/1948 | Peterson | 239/57 X |
| 2,733,098 | 1/1956 | Holt | 239/55 X |
| 4,523,870 | 6/1985 | Spector | 454/157 |
| 4,676,954 | 6/1987 | Wilson | 422/124 |
| 4,722,264 | 2/1988 | De Guisseppe | 454/157 |
| 4,813,344 | 3/1989 | Greif | 454/157 X |
| 5,141,707 | 8/1992 | Brite | 422/124 |

FOREIGN PATENT DOCUMENTS

| 162022 | 11/1985 | European Pat. Off. . |
| 1-230363 | 9/1989 | Japan . |
| 1514712 | 6/1978 | United Kingdom . |

*Primary Examiner*—Harold Joyce
*Attorney, Agent, or Firm*—Richard C. Litman

[57] ABSTRACT

A vehicle air freshener is quickly and easily installable and removable from an outlet grille of the vehicle ventilating system. The air freshener includes a tube filled with a fragrance saturated absorbent material. The tube has a sufficiently small diameter to pass through the typical opening in a vehicle interior ventilation outlet grille, and includes a thin, elongate extension and handle which is wider than the grille opening, to preclude passage of the handle through the grille opening. The air freshener is initially provided with one or more sealed scent passages, which are punctured or otherwise removed to allow the scent or fragrance to escape the interior of the air freshener and mix with the air. After opening the scent passage seal, the air freshener is inserted into the ventilation grille opening and is prevented from falling into the ductwork of the ventilation system by the handle which is caught on the outside of the grille, thereby substantially concealing the air freshener. Any air flowing through the ventilation system will absorb the fragrance escaping from the opened scent passage and pass into the vehicle interior. The air freshener may be easily removed when the scent is depleted or no longer desired, by grasping the handle and withdrawing the air freshener from the duct and grille opening. At least the handle portion may be provided in different colors to closely match the colors of various ventilation grilles, in order to provide an unobtrusive appearance.

17 Claims, 1 Drawing Sheet

VEHICLE AIR FRESHENER

REFERENCE TO RELATED APPLICATION

This application is a continuation in part of U.S. Design patent application Ser. No. 07/825,879 filed on Jan. 27, 1992.

FIELD OF THE INVENTION

The present invention relates generally to air freshening and scenting devices, and more specifically to a portable and disposable device which is easily and quickly installable in, and removable from, an interior heating, air conditioning or ventilator outlet grille of an automobile or other vehicle.

BACKGROUND OF THE INVENTION

Operators of modern automobiles, trucks and other vehicles tend to demand a more comfortable environment in those vehicles than was expected in the past. Today, motor vehicle operators expect more from a vehicle than mere transportation. Accordingly, manufacturers have generally provided heating, ventilating and air conditioning systems which allow a vehicle driver to shut out the outside environment during the majority of time spent in the vehicle.

However, all vehicles will eventually absorb or acquire unpleasant odors in the course of their use, due to smoking in the interior of the vehicle, spilled food or drink, etc. This was a relatively minor problem when vehicles were not generally constructed to the relatively tight standards used today, and before the development of air conditioning systems for most vehicles. At that time, most vehicles were driven with a window or windows open, particularly in warm weather when unpleasant odors tend to be at their worst. Moreover, increasing atmospheric pollution and noise, particularly in crowded urban areas, has resulted in the shutting out of those negative external environmental factors by more and more drivers.

As noted above, unpleasant odors may be trapped to a certain extent in such tightly enclosed vehicles. Various solutions have been proposed for their concealment or elimination, but all suffer from various defects in view of the present invention, such as a tendency to block the airflow through a vent; inability to be controlled or removed when the scent is not desired; lack of portability; and excessive cost and complication.

The need arises for an air freshening and/or scenting device which is easily and quickly temporarily installable in and removable from the heating, ventilating or air conditioning system of a vehicle. The device should be easily replaceable when the supply of scent therein is depleted, and should be unobtrusive when installed. Further, the device should impinge as little as possible upon the airflow delivered by the vent within which it is installed. Moreover, the device should be of relatively low cost and simple to install initially and to manipulate as desired by the operator of the vehicle.

DESCRIPTION OF THE PRIOR ART

Applicant is aware of the following patents which generally relate to the present invention:

U.S. Pat. No. 4,523,870 issued to Donald Spector on Jun. 18, 1985 discloses an Aroma Dispensing Cartridge And Holder Assembly For Automobiles. The device installs on the outside or downstream side of an automobile vent grille, thereby significantly restricting any air flow through the vent. The specific provided for securing the device to a vent grille restricts its use to a relatively small number of vent grilles which are cooperatingly formed, and its location on the outside of the vent results in an unsightly juxtaposition of elements in the otherwise coordinated interior environment of the automobile.

U.S. Pat. No. 4,696,954 issued to James L. Wilson on Jun. 30, 1987 discloses an Air Freshener for use with the air return duct system in a home or building. The device installs on the outside or inlet side of the return duct opening, or completely opposite the installation of the present invention. The device is relatively large and bulky, precluding use in an automobile or other vehicle. Moreover, as the device is installed on the outside of the duct, the device is plainly visible to persons within sight of the duct opening and further takes up space in the room which might be better utilized for other purposes.

U.S. Pat. No. 4,813,344 issued to Averell Greif on Mar. 21, 1989 discloses a Deodorizer Container which is installable on the vent louvers of an automobile. The container projects from the vent when in use, providing an unsightly appearance in the manner of the devices discussed above. In addition, the device must at least be initially installed by disassembling the vent grille structure in order to gain access to the louvre for initial attachment thereto. Due to the relatively wide rectangular shape presented, the device is only installable on a relatively small range of cooperating vent grilles and louvers, and no means is seen for the closure of the louvre when the device is installed thereon.

British Patent No. 1,514,712 to Peter R. Cashmore, published on Jun. 21, 1978, discloses Air Fresheners installable over the defroster or demister vents in an automobile. Again, the device is installed on the outside of the vent adjacent to the inner surface of the vehicle windshield, and may significantly block the flow through the defroster vent. While the present invention may be used in combination with a defroster vent, such vents are generally used only a small percentage of the time a vehicle is in operation, and thus would not provide for the scenting or freshening of incoming air to the extent that a unit in combination with the interior vent system would.

European Patent No. 162,022 to Maria C. Cantoni, published on Nov. 21, 1985, discloses a Multiple Filter Unit which may be inserted within a ventilation duct. However, the device seals tightly against the inner walls of such a duct, and with the plural filters disclosed to remove not only particulate matter but also pollutant gases from the air, the device would significantly restrict the airflow from the duct. No scenting of the air is disclosed. Moreover, any grille and/or louvers disposed immediately at the vent or duct outlet would have to be removed to allow the installation of the device therein, unlike the present invention. Also, plural devices would have to be installed in each incoming vent duct to ensure that all incoming air is filtered. The present invention may be installed and will be operable in a single vent duct, as no filtration is provided. The scent added to the air output from the duct by means of the present invention will permeate the entire interior of the vehicle so long as air is flowing through the duct and past the device.

Japanese Patent No. 1,230363 published on Sep. 13, 1989 discloses a filtration and/or scenting device which is installed at one end of a duct having a fan therein. The device is not workable in combination with an air vent outlet or grille in a vehicle, due to its size, bulk and tendency to impede the airflow through such a grille. No means of readily replacing the element is disclosed.

In addition to the above, applicant is aware of commercial products which provide for scenting or freshening the air in the interior of an automobile. These known products are not disposed over or within an air vent, but rather are suspended from the interior rear view mirror or otherwise positioned within the vehicle. Thus, any scent provided must depend upon general air circulation within the vehicle and is not affected by the more rapid specific distribution provided by air outflow from a vent.

None of the above noted patents, taken either singly or in combination, are seen to disclose the specific arrangement of concepts disclosed by the present invention.

SUMMARY OF THE INVENTION

By the present invention, an improved air freshener or scent dispensing device for vehicle interiors is disclosed.

Accordingly, one of the objects of the present invention is to provide a device which dispenses a pleasing and refreshing scent or aroma into a vehicle interior.

Another of the objects of the present invention is to provide an air freshening device which is installable in combination with the ventilating system of a vehicle.

Yet another of the objects of the present invention is to provide an air freshening device which is installable within the heating, air conditioning and/or ventilating duct system of a vehicle without need to disassemble or modify the duct system.

Still another of the objects of the present invention is to provide an air freshening device which is quickly and easily installable and removable from the vent duct system of a vehicle.

A further object of the present invention is to provide an air freshening device which is disposed substantially within the vent duct and which protrudes no more than slightly from the vent outlet or grille, thereby eliminating any significant unsightly protrusion from the vent outlet or grille.

An additional object of the present invention is to provide an air freshening device which is economical to manufacture and purchase and which is readily disposable when depleted.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attach drawings.

DETAILED DESCRIPTION OF THE PREFERRED EMBODIMENT

Figure 2:
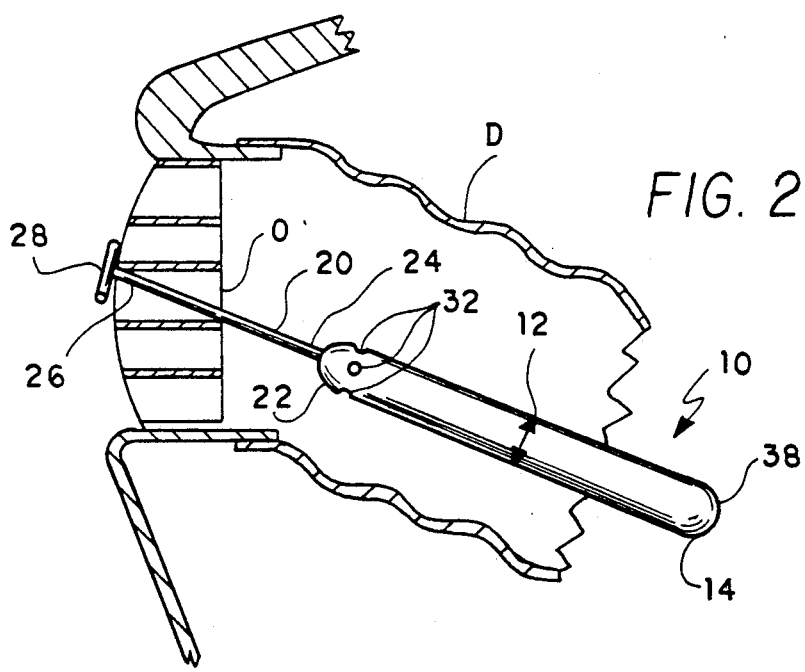
FIG. 2 is a broken away view in section of a typical vehicle heating, air conditioning and/or ventilation duct outlet and grille, showing the air freshener device of the present invention installed therein.

Referring now to the drawings, the present invention will be seen to relate to an air freshener or scent device 10 which is easily, quickly and temporarily installable and removable from an existing vehicle heating, air conditioning and/or ventilating air system duct D. Air freshener 10 is preferably of a round cross section and has a diameter 12 less than the width of an opening O in a typical vehicle air system outlet grille G, thereby allowing the insertion of the main body 14 of air freshener 10 completely through a grille opening O to reside entirely within the air duct D, as shown in FIG. 2 of the drawings. Typically, the diameter 12 of air freshener 10 will be on the order of one half inch, but it will be understood that air freshener 10 may be constructed to have diameters 12 larger or smaller than one half inch, as desired.

Figure 3:
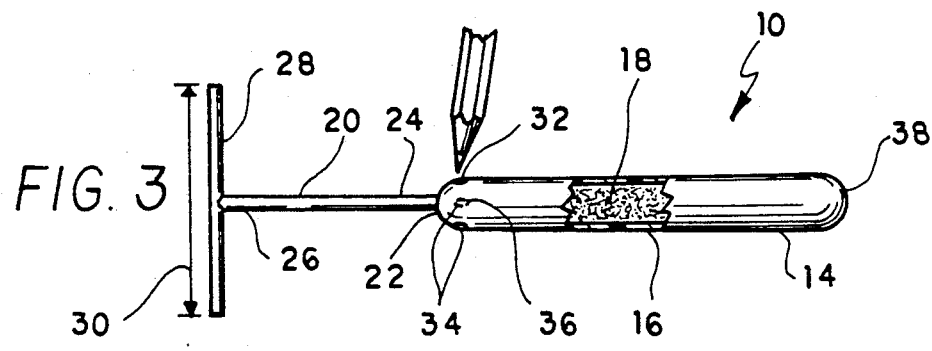
FIG. 3 is a partially broken away side view of the air freshener device of the present invention, showing the interior and the method of activation of the device.

The main body 14 of air freshener 10 is formed of a relatively thin walled hollow shell 16, as shown in FIG. 3. Shell 16 is preferably formed of a plastic material, but any suitable non permeable material (e.g., metal) may be used alternatively. The interior of shell 16 is filled with an absorbent material 18, which may comprise a synthetic or natural open cell material, paper, or any other suitable material. Absorbent material 18 is saturated with a pleasing fragrance or scent before material 18 is sealed within the shell 16 before use. Any one of a virtually unlimited number of scents or fragrances may be used With air freshener 10; pine, floral, citrus, leather, etc. comprise only a partial list which is by no means exhaustive.

An extension 20 is provided extending from a first end 22 of the main body 14, generally coaxial with the main body 14. Extension 20 is preferably formed of the same material used for construction of main body shell 16, but alternative materials may be used. The first end 24 of extension 20 is joined to the first end 22 of the main body 14, while the second end 26 of extension 20 terminates in a thin, wire-like handle 28. Handle 28 will be seen to be essentially centrally and orthogonally joined to the second end 26 of extension 20, whereby extension 20 and handle 2 essentially serve to form a T shape, and has a length 30 greater than the width of a grille opening O to preclude passage therethrough. Other configurations may be used for extension 20 and handle 28, such as a hook formed in the second end 26 extension 20, etc.

As the shell 16 of the main body 14 is completely sealed to contain the fragrance or scent therein prior to use, means must be provided for the dispensing of such fragrance or scent in order to use air freshener device 10. One or more scent passages 32 are provided and are preferably located near the first end 22 of the main body 14. Scent passages 32 are sealed during the construction of air freshener 10 by means of seals 34, which seals 34 may be integral and contiguously formed with the formation of shell 16. Partial perforations 36 or other frangible construction may be provided around the periphery of seals 34 in order to provide for ease of opening. Other sealing means (e.g., tape, shrink wrap material, etc.) may be used alternatively.

Figure 1:
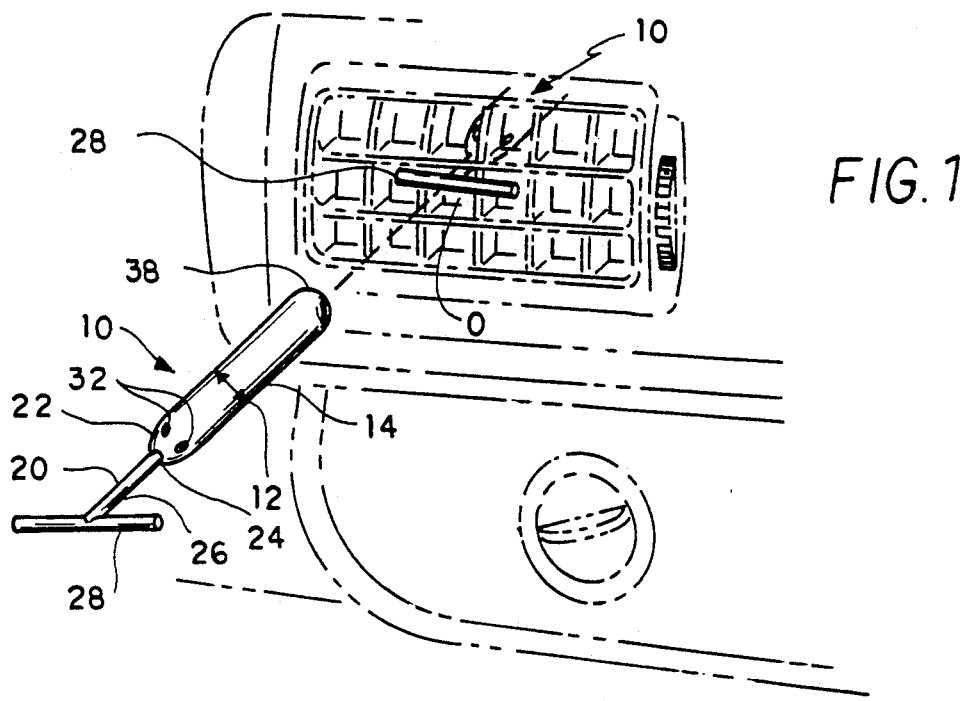
FIG. 1 is a perspective view of the air freshener of the present invention, showing its insertion within a typical vehicle ventilation grille.

Air freshener 10 is used by first opening seals 34 in order to allow the scent or fragrance with which absorbent material 18 is saturated, to escape. This may be accomplished by puncturing the seals 34 with any convenient and relatively sharp object, such as a pencil or pen P as shown in figure 3. The partial perforations 36 or other frangible means provided, will break or separate accordingly and allow seals 34 to be opened and pushed aside or into shell 16 to permit the enclosed scent or fragrance to communicate and mix with the exterior air. Air freshener 10 may then be inserted into an opening O in a grille G of a vehicle interior air system in any suitable location as desired. The generally spherically shaped second end 38 of the main body 14 will allow air freshener 10 to pass easily through any suitably sized openings O within a grille G without any corners or edges to catch or snag on any of the vent components. The T shape provided by the handle 28 and second end 26 of extension 20, serve to preclude passage of those portions of air freshener 10 through the grille opening O. However, it will be seen in figures 1 and 2 that by far the greatest portion of air freshener 10 will be disposed completely within the grille G and duct D of the vehicle air system, with only the relatively thin wire or wire-like portion of handle 28 protruding from the grille G into the vehicle interior. Thus, air freshener 10 may be easily installed in a vehicle air system without need for any modification or disassembly of any of the ventilation or air supply components of the vehicle, yet air freshener 10 is unobtrusive when installed as the thin handle portion 28 is the only component which extends from the grille G, as noted above. Air freshener 10 may be further concealed by providing at least the handle 30 portion 28 in a color closely approximating that of the grille G into which air freshener 10 is inserted. The result renders air freshener 10 all but invisible to the casual observer when in use, while still being readily insertable and removable.

Due to the weight and center of gravity of air freshener 10, the body portion 14 will be seen to depend downwardly within an air duct D into which it is inserted. This orientation of air freshener 10 serves to preclude any liquid scent from flowing from scent passages 32, as they are preferably disposed near the higher or first end 24 of the main body portion 14, near the first end 24 of extension 20. However, the fragrance or scent with which the absorbent material 18 within shell 16 is saturated, will be free to evaporate and communicate with the surrounding air by means of scent passages 32. When air flows or travels through the duct D by means of natural flow or the vehicle ventilating fan, it will pick up the scent passing from the scent passages 32 and carry the scent or fragrance throughout the vehicle as it is ventilated.

When the scent or fragrance contained within air freshener 10 is depleted, or when the use of air freshener 10 is no longer desired, removal is easily accomplished by grasping the handle 281 and withdrawing air freshener 10 from the grille opening O. The generally convex conical first end 22 of the main body 14, adjacent the first end 24 of extension 20, precludes the snagging or catching of the main body 14 of air freshener 10 upon any components of the vehicle air ventilation system such as the interior of grille G. If a supply of scent or fragrance remains within the shell 16, air freshener 10 may be retained for further use at a later time if desired. Scent passages 32 may be temporarily sealed with tape or other means if later use of air freshener 10 is desired.

Accordingly, an air freshener device 10 for use in the interior heating, air conditioning and/or ventilating duct system of a vehicle is disclosed. The device is preferably installed within a grille G situated in the dash of the vehicle, but may be installed in floor outlets, defroster outlets, or other location as desired. Actuation of the electrical heating, air conditioning and/or ventilation fan of the vehicle will cause the scent contained within air freshener 10 to be dispensed throughout the vehicle, or the natural flow provided by a flow through ventilation system may be utilized if such is available. In the event that air freshener 10 is installed in a louvered grille and it is desired to close off the flow of air through that grille by closing the louvers, air freshener 10 may be easily removed and stored for future use or reinstalled in another grille or air outlet as desired. The extremely economical construction of air freshener 10 provides for disposal when depleted or its use is no longer desired without undue cost to the user.

It is to be understood that the present invention is not limited to the sole embodiment described above, but encompasses any and all embodiments within the scope of the following claims.

I claim:

1. A vehicle air freshener installable through the grille opening and within a duct of an interior air ventilation system of a vehicle, the ventilation system having a colored outlet grille and providing an air flow through the ventilation system and into the interior of the vehicle, with said air freshener comprising:

a main body shell having a diameter less than that of the grille opening and including a first end, an opposite second end, and a hollow interior;

said hollow interior containing an absorbent material with said absorbent material saturated with a fragrant substance;

retaining means having a first end joined to said first end of said main body shell and an opposite second end, with said retaining means second end including means for engaging said outlet grille for precluding passage thereof through the ventilation system grille; and scent passage means comprising at least one scent passage extending through said main body shell, whereby said vehicle air freshener is passed through the grille opening and into the duct of the vehicle ventilation system and retained therein by means of said vehicle ventilation system grille precluding passage of said retaining means second end therethrough, and said fragrance saturating said absorbent material communicates with the air flowing through the ventilation system by means of said scent passage means to impart a fragrance to the air flowing into the vehicle by means of the vehicle ventilation system.

2. A vehicle air freshener according to claim 1 wherein:

said main body shell is substantially cylindrical.

3. A vehicle air freshener according to claim 1 wherein:

said main body shell second end is substantially spherical.

4. A vehicle air freshener according to claim 1 wherein:

said main body shell first end is substantially conical.

5. A vehicle air freshener according to claim 1 wherein:

said retaining means is coaxial with said main body shell.

6. A vehicle air freshener according to claim 1 wherein:

said retaining means second end includes a handle means orthogonally joined to said retaining means second end.

7. A vehicle air freshener according to claim 6 wherein:

said retaining means and handle means comprise thin, elongate extensions forming a generally T shaped configuration.

8. A vehicle air freshener according to claim 6 wherein:

said handle means is wider than the grille opening.

9. A vehicle air freshener according to claim 6 wherein:

at least said handle means is of a color closely matching the grille color.

10. A vehicle air freshener according to claim 1 wherein:

said at least one scent passage includes a removable seal.

11. A vehicle air freshener according to claim 10 wherein:

said removable seal is integrally formed with said main body shell.

12. A vehicle air freshener according to claim 11 wherein:

said main body shell includes a plurality of partial perforations between said main body shell and said removable seal.

13. A vehicle air freshener according to claim 1 wherein:

at least said main body shell is formed of plastic.

14. A vehicle air freshener according to claim 1 wherein:

said main body shell and said retaining means are formed of plastic.

15. A vehicle air freshener according to claim 1 wherein:

said absorbent material is formed of paper.

16. A vehicle air freshener according to claim 1 wherein:

said absorbent material is formed of a synthetic open cell material.

17. A vehicle air freshener according to claim 1 wherein:

said absorbent material is formed of a natural open cell material.

* * * * *